（12) United States Patent
Berke et al.

(10) Patent No.: US 9,280,497 B2
(45) Date of Patent: Mar. 8, 2016

(54) SYSTEMS AND METHODS FOR SUPPORT OF NON-VOLATILE MEMORY ON A DDR MEMORY CHANNEL

(71) Applicants: Stuart Allen Berke, Austin, TX (US); Shawn J. Dube, Austin, TX (US)

(72) Inventors: Stuart Allen Berke, Austin, TX (US); Shawn J. Dube, Austin, TX (US)

(73) Assignee: Dell Products LP, Round Rock, TX (US)

( * ) Notice: Subject to any disclaimer, the term of this patent is extended or adjusted under 35 U.S.C. 154(b) by 243 days.

(21) Appl. No.: 13/723,695

(22) Filed: Dec. 21, 2012

(65) Prior Publication Data

US 2014/0181364 A1    Jun. 26, 2014

(51) Int. Cl.
G06F 12/02 (2006.01)
G06F 13/16 (2006.01)
G06F 12/08 (2006.01)

(52) U.S. Cl.
CPC ............ *G06F 13/16* (2013.01); *G06F 13/1673* (2013.01); *G06F 12/0866* (2013.01); *G06F 2212/205* (2013.01)

(58) Field of Classification Search
CPC .......... G06F 12/1081; G06F 13/1668–13/1694
USPC .......................... 711/103, 143, 144
See application file for complete search history.

(56) References Cited

U.S. PATENT DOCUMENTS

| | | | | |
|---|---|---|---|---|
| 4,598,362 A * | 7/1986 | Kinjo | ................. | G06F 13/1673 711/148 |
| 5,535,328 A * | 7/1996 | Harari | ................. | G06F 3/0601 365/218 |
| 6,195,303 B1 * | 2/2001 | Zheng | ................. | G11C 11/406 365/222 |
| 6,757,788 B2 * | 6/2004 | Kawamoto | .......... | G06F 12/0817 709/225 |
| 6,820,145 B2 * | 11/2004 | Wingen | ................. | G06F 13/385 370/416 |
| 7,231,490 B2 * | 6/2007 | Kanai | ................. | G06F 3/0607 711/112 |
| 7,320,051 B2 * | 1/2008 | Kanai | ................. | G06F 3/0607 711/112 |
| 7,380,058 B2 * | 5/2008 | Kanai | ................. | G06F 11/2089 711/113 |

(Continued)

FOREIGN PATENT DOCUMENTS

WO    WO 2013016723 A2 *  1/2013  .......... G06F 12/0246

OTHER PUBLICATIONS

Webopedia, DMA, Jul. 2008.*

(Continued)

*Primary Examiner* — Jared Rutz
*Assistant Examiner* — Khoa D Doan
(74) *Attorney, Agent, or Firm* — Egan, Peterman & Enders LLP.

(57) ABSTRACT

Systems and methods are provided for supporting use of non-volatile memory (NVM) on a double data rate (DDR) memory channel for an information handling system so that non-volatile memory devices (e.g., such as Phase Change Memory "PCM" devices) may be employed for main memory usage. In one possible implementation, information handling system memory reads may be managed directly in hardware as memory semantics via use code, while memory writes may be separately handled, e.g., via an operating system (OS)/driver. In another possible implementation, both DRAM-based and NVM-based memory systems may be populated for an information handling system.

26 Claims, 10 Drawing Sheets

(56) References Cited

U.S. PATENT DOCUMENTS

| | | | | |
|---|---|---|---|---|
| 7,979,627 | B2* | 7/2011 | Arakawa | G06F 12/0246 711/103 |
| 8,874,831 | B2* | 10/2014 | Lee | G06F 12/0246 365/185.33 |
| 8,914,568 | B2* | 12/2014 | Chinnaswamy | G06F 12/08 711/103 |
| 8,930,647 | B1* | 1/2015 | Smith | G06F 9/44557 711/103 |
| 2002/0078292 | A1* | 6/2002 | Chilton | G06F 12/0866 710/305 |
| 2004/0123028 | A1* | 6/2004 | Kanai | G06F 11/2089 711/113 |
| 2004/0123036 | A1* | 6/2004 | Hammitt | G06F 13/1684 711/131 |
| 2004/0136259 | A1* | 7/2004 | Klint | G06F 13/1694 365/232 |
| 2006/0112201 | A1* | 5/2006 | Hammitt | G06F 13/385 710/52 |
| 2006/0171219 | A1* | 8/2006 | Morzano | G11C 8/10 365/200 |
| 2008/0082731 | A1* | 4/2008 | Karamcheti | G06F 13/1657 711/103 |
| 2008/0094808 | A1 | 4/2008 | Kanapathippillai et al. | |
| 2009/0248958 | A1* | 10/2009 | Tzeng | G06F 12/08 711/103 |
| 2010/0037001 | A1 | 2/2010 | Langlois et al. | |
| 2010/0082881 | A1* | 4/2010 | Klein | G06F 13/14 711/103 |
| 2010/0110748 | A1* | 5/2010 | Best | G06F 12/0638 365/51 |
| 2010/0125681 | A1* | 5/2010 | Patel | G06F 1/3203 710/14 |
| 2010/0217924 | A1* | 8/2010 | Panabaker | G06F 12/06 711/103 |
| 2010/0287217 | A1* | 11/2010 | Borchers | G06F 12/0246 707/813 |
| 2011/0016268 | A1* | 1/2011 | Qawami | G11C 13/0004 711/105 |
| 2011/0082971 | A1* | 4/2011 | Berke | G11C 7/1072 711/105 |
| 2011/0125953 | A1* | 5/2011 | Sartore | G06F 12/0638 711/103 |
| 2011/0153916 | A1* | 6/2011 | Chinnaswamy | G06F 12/08 711/103 |
| 2011/0264846 | A1* | 10/2011 | Oh | G11C 7/1051 711/103 |
| 2012/0144102 | A1* | 6/2012 | Langlois | G06F 12/0246 711/103 |
| 2012/0265949 | A1* | 10/2012 | Shimizu | G06F 13/1689 711/154 |
| 2013/0166836 | A1* | 6/2013 | Berke | G11C 7/1072 711/105 |
| 2013/0254506 | A1* | 9/2013 | Berke | G06F 11/0793 711/165 |
| 2013/0262744 | A1* | 10/2013 | Ramachandra | G11C 5/066 711/103 |
| 2013/0329491 | A1* | 12/2013 | Chang | G11C 11/005 365/185.03 |
| 2013/0339572 | A1* | 12/2013 | Fanning | G11C 16/00 711/102 |
| 2014/0040550 | A1* | 2/2014 | Nale | G06F 13/1694 711/118 |
| 2014/0208047 | A1* | 7/2014 | Vembu | G06F 12/0292 711/161 |
| 2015/0138884 | A1* | 5/2015 | Park | G06F 13/16 365/185.08 |

OTHER PUBLICATIONS

Wikipedia, "Solid-State Drive", Printed from Internet Aug. 7, 2012, 26 pgs.
Wikipedia, "Flash Memory", Printed from Internet Aug. 7, 2012, 16 pgs.
Wikipedia, "USB Flash Drive", Printed from Internet Aug. 7, 2012, 20 pgs.
Wikipedia, "DDR SDRAM", Printed from Internet Aug. 7, 2012, 8 pgs.
Wikipedia, "Serial Presence Detect", Printed from Internet Aug. 3, 2012, 15 pgs.
IDT, "IDT Introduces Industry's First Fully JEDEC-Compliant Memory Buffer for DDR3 LRDIMM", Printed from Internet, Aug. 3, 2012, 1 pg.
Inphi, "Inphi Samples First JEDEC-Compatible Memory Buffer That Enables a New-Class of Memory Modules Load Reduced DIMMs", Printed from Internet Aug. 3, 2012, 2 pgs.
Caulfield et al., "Understanding the Impact of Emerging Non-Volatile Memories on High-Performance, IO-Intensive Computing", IEEE, 2010, 11 pgs.
Wikipedia, "CPU Cache", Printed from Internet Jun. 26, 2012, 23 pgs.
Viking Technology, "*Satadimm SSD vs. PCIe SSD*", Technical Brief, Printed from Internet Jun. 26, 2012, 4 pgs.
Viking Technology, Solid State Drives (SSD), Sata Enterprise, Printed from Internet Jun. 26, 2012, 1 pg.
Viking Technology, Solid State Drives (SSD), Enterprise Satadimm, Printed from Internet Jun. 26, 2012, 2 pgs.
Viking Technology, "Solid State Drives (SSD)", Enterprise Satadimm, Printed from Internet Jun. 26, 2012, 2 pgs.
Viking Technology, "Solid State Drives (SSD)", Industrial Satadimm, Printed from Internet Jun. 26, 2012, 1 pg.
Viking Technology, "Solid State Drives (SSD)", Industrial Satadimm, Printed from Internet Jun. 26, 2012, 2 pgs.
Viking Technology, "Enterprise Storage Solutions With High Performance Hybrid, SSD, and DRAM Technology", Printed from Internet Jun. 26, 2012, 6 pgs.
Viking Technology, "Satadimm", Stadimm Solid State Drive, Printed from Internet Jun. 26, 2012, 2 pgs.
Viking Technology, "Satadimm Flash Array Enabling the World's Most Powerful 1U JBOD", Printed from Internet Jun. 26, 2012, 2 pgs.
Viking Technology, Solid State Drives (SSD), Enterprise Satadimm, Printed from Internet Jun. 26, 2012, 3 pgs.
Viking Module Solutions, "Enabling 1.4 Million IOPS in a 1U Server", Printed from Internet Jun. 26, 2012, 1 pg.
The Hard Drive Shortage of 2012, Printed from Internet Jun. 26, 2012, 3 pgs.
Dimm SSDs Provide a Better, Faster Boot Drive, Printed from Internet Jun. 26, 2012, 4 pgs.
How to Get 2TB More Storage in Every 2U Server, Printed from Internet Jun. 26, 2012, 4 pgs.
Viking Technology, "The Innovation of Form & Function", Printed from Internet Dec. 20, 2012, 1 pg.
Viking Technology, "Swap Optimized Storage", Printed from Internet Dec. 20, 2012, 1 pg.
Viking Technology, "BGA Stacking, Enabling High-Capacity DRAM Modules", Printed from Internet Dec. 20, 2012, 1 pg.
Viking Technology, "Form & Function Solid State Drives in a Dimm Form Factor", Printed from Internet Dec. 20, 2012, 1 pg.
Viking Technology, "Introducing Non-Volatile Dimm", Printed from Internet Dec. 20, 2012, 1 pg.

* cited by examiner

| Command | Address | Data | Annotation |
|---|---|---|---|
| Read | X+0x2000 | --- | Data was not previously cached |
| --- | --- | read return from 0x2000 | Data returned from NVM DIMM |
| Write | X+Y+0x0000 | data from 0x2000 | Data written to write-buffer |
| Read | X+0x2040 | --- | Data was not previously cached |
| Write | X+Y+0x0040 | data from 0x2040 | Data written to write-buffer |
| Read | X+0x2080 | --- | Data was not previously cached |
| --- | --- | read return from 0x2080 | Data returned from NVM DIMM |
| ...read/write pattern continues... | | | |
| --- | --- | read return from 0x2FC0 | Data returned from NVM DIMM |
| Write | X+Y+0x0FC0 | data from 0x2FC0 | Data written to write-buffer |
| Write | X+Y+0x10000 | 0x00009000, 0x00001000, Write, ... | Destination offset and size argument, and write command |
| Read | X+Y+0x10020 | --- | Read from NVM status register |
| --- | --- | busy status return | Status return indicating busy with previous write |
| Read | X+Y+0x10020 | --- | Read from NVM status register |
| --- | --- | write-successful status return | Status return indicating not busy with previous write |

FIG. 7

SYSTEMS AND METHODS FOR SUPPORT OF NON-VOLATILE MEMORY ON A DDR MEMORY CHANNEL

FIELD OF THE INVENTION

This invention relates generally to information handling systems and, more particularly, to support of non-volatile memory on a double data rate (DDR) memory channel for an information handling system.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Servers are one type of information handling system. The number of features included in current servers have grown to the point such that there is little, if any, volumetric room for new features. All system links and input/output (TO) interconnects may be completely consumed (Intel QuickPath Interconnect "QPI", Advanced Micro Devices HyperTransport "HT" links, Peripheral Component Interconnect Express "PCIe" lanes, double data rate "DDR" channels). As an example, a current mainstream 2U Server may include two to four CPUs, 18 to 48 dual in-line memory modules "DIMMs", 16 to 24 drives, 7 PCIe slots, and two power supply units (PSUs). The ratio of DIMM sockets typically included in mainstream servers has grown from two to three DIMM sockets per CPU socket in 2005 to 12 to 24 DIMM sockets per CPU socket in 2012. A considerable portion of the server internal feature volume is reserved for these DIMM sockets, but it is not uncommon for a server owner or operator to not fill all of the provisioned DIMM sockets with DIMMs.

It is typically desirable to provide a tiered main memory for an information handling system in order to optimize performance, cost, power, and Reliability/Availability/Serviceability (RAS). Many applications have large working sets needing efficient random reads, with reduced needs for efficient write operations. Examples of such applications include large databases and high performance computer cluster (HPCC) applications such as fast Fourier transforms (FFTs). Dynamic random access memory (DRAM) is expensive, rotation-media disk-drives have excessive latency, and conventionally accessed solid state drives "SSDs" (such as SAS-based or PCIe-based SSDs) have high processing overhead.

RAM disks or Ram drives have been implemented as a block or file storage in main volatile memory of an information handling system, and accessed via an operating system (OS) driver.

SUMMARY OF THE INVENTION

Disclosed herein are systems and methods for supporting use of non-volatile memory (e.g., such as Single/Multi/Tri-Level Cell NAND Flash, Magnetic RAM (MRAM), Spin Torque Technology MRAM (STT MRAM), Ferroelectric Memory (FERAM), Resistive Memory (RRAM, ReRAM, "memristor"), phase change memory, etc.) on a double data rate (DDR) memory channel for an information handling system. In one exemplary embodiment, non-volatile memory devices (e.g., such as Phase Change Memory "PCM" devices) may be employed for main memory usage in those applications where the specific non-volatile memory devices have an access time and sufficient write endurance to fit the application. In another exemplary embodiment, information handling system memory reads may be managed directly in hardware (e.g., via a non-integrated memory controller or an integrated memory controller "iMC") as memory semantics via user code, while memory writes may be separately handled, e.g., via an operating system (OS)/driver. In one exemplary embodiment, the disclosed systems and methods may be used to allow both DRAM-based and NVM-based DIMMs to be populated such that information handling system (e.g., server) internal volume may more favorably be utilized fully, e.g., as required by a user of the information handling system. Moreover, given current mainstream host processors that offer three to four DDR channels per socket (with that number expected to double to six to eight DDR channels per socket in the next 5 to 10), the disclosed systems and methods may be further implemented to allow system configurations that are optimized for the individual user application requirements.

In one respect, disclosed is an information handling system, including at least one host processing device configured to execute an operating system (OS) and one or more OS write drivers configured to manage writes; and a double data rate (DDR)-based non-volatile memory (NVM) system including one or more NVM devices coupled to the host processing device through a memory buffer, the memory buffer being coupled to the host processing device by a DDR memory channel and the memory buffer being coupled to the DDR-based NVM system by a NVM channel. The host processing device may be configured to access the DDR-based NVM system across the DDR memory channel for data read and data write operations through the memory buffer and the NVM channel. The memory buffer may be configured to respond to receipt of standard DDR read commands received across the DDR memory channel from the host processing device by performing direct reads of data stored on the NVM memory devices across the NVM channel, and providing the read data to the host processing device across the DDR memory channel. The memory buffer may be configured to respond to receipt of write commands received across the DDR memory channel from the OS write drivers of the host processing device by performing indirect writes of data to the NVM memory devices across the NVM channel.

In another respect, disclosed herein is a method for reading and writing data to a double data rate (DDR)-based non-volatile memory (NVM) system, the method including: providing at least one host processing device configured to execute an operating system (OS) and one or more OS write drivers configured to manage writes; providing a double data rate (DDR)-based non-volatile memory (NVM) system including one or more NVM devices coupled to the host processing device through a memory buffer, the memory buffer being coupled to the host processing device by a DDR memory channel and the memory buffer being coupled to the DDR-based NVM system by a NVM channel; accessing the DDR-based NVM system across the DDR memory channel using the host processing device for data read and data write operations through the memory buffer and the NVM channel; responding to receipt of standard DDR read commands received across the DDR memory channel in the memory buffer from the host processing device by performing direct reads of data stored on the NVM memory devices across the NVM channel, and providing the read data to the host processing device across the DDR memory channel; and responding to receipt of write commands received across the DDR memory channel in the memory buffer from the OS write drivers of the host processing device by performing indirect writes of data to the NVM memory devices across the NVM channel.

BRIEF DESCRIPTION OF THE DRAWINGS

FIG. 7 illustrates DDR channel level transactions for direct reads and indirect writes according to one exemplary embodiment of the disclosed systems and methods.

DESCRIPTION OF ILLUSTRATIVE EMBODIMENTS

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
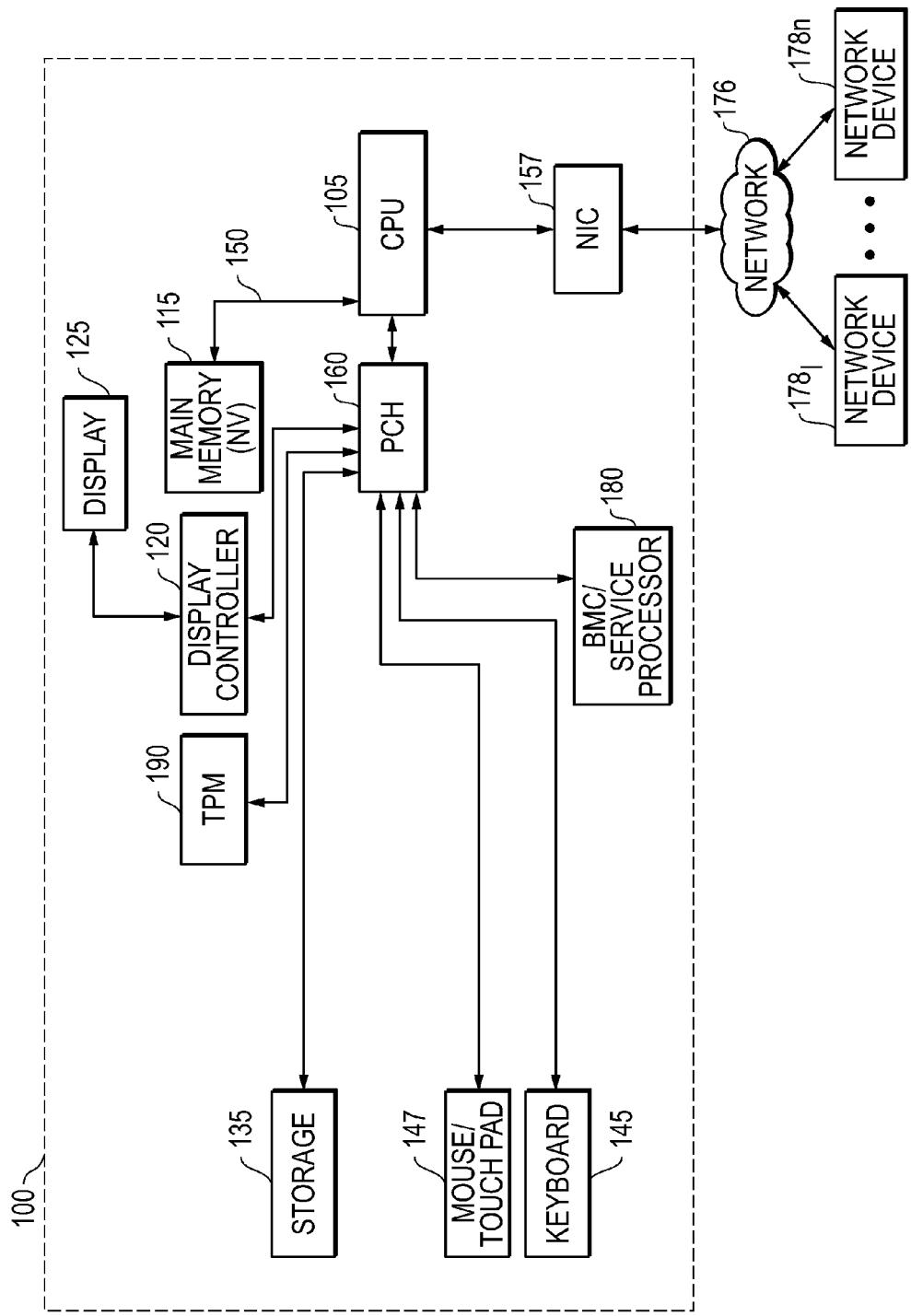
FIG. 1 is a simplified block diagram of an information handling system according to one exemplary embodiment of the disclosed systems and methods.

FIG. 1 is a block diagram of an information handling system 100 as it may be configured as a computer server system according to one exemplary embodiment of the disclosed systems. In this regard, it will be understood that the server configuration of FIG. 1 is exemplary only, and that the disclosed systems and methods may be implemented on any other type of information handling system (e.g., desktop computer, portable computer such as laptop computer, etc.). As shown in FIG. 1, information handling system 100 of this exemplary embodiment includes at least one processing device 105, which may each be a central processing unit CPU such as an Intel Xeon series processor, an Advanced Micro Devices (AMD) processor or one of many other processing devices currently available. In this embodiment, CPU 105 executes an operating system (OS) for system 100. In this exemplary embodiment, CPU 105 is provided with an integrated memory controller (iMC) to facilitate memory functions, although it will be understood that a memory controller may be alternatively provided as a separate chip or other circuit in other embodiments. Main system memory 115 may be coupled via DDR channel 150 as shown to CPU 105. In this embodiment, main system memory 115 includes non-volatile memory (e.g., such as PCM memory).

Still referring to the exemplary embodiment of FIG. 1, a display 125 (e.g., LCD display or other suitable display device) is coupled to display controller 120 to provide visual images to the user. Display controller 120 is in turn coupled to processing device 105 via platform controller hub (PCH) 160 which facilitates input/output functions for the information handling system 100. Local system storage 135 (e.g., one or media drives such as hard disk drive/s, optical drives, NVRAM, Flash or any other suitable form of internal or external storage) may be coupled to PCH 160 and its controller chip to provide permanent storage for the information handling system. Input devices such as a keyboard 145 and mouse/touchpad 147 may be optionally coupled to PCH 160 and its controller chip to enable the user to interact with the information handling system 100 and programs or other software/firmware executing thereon. An embedded Baseboard Management Controller (BMC) 180 running system firmware and an optional trusted platform module (TPM) 190 are each also shown coupled to PCH chip 160.

Also shown coupled to processing device 105 for this exemplary server embodiment is network interface card (NIC) 157 that may be optionally provided to enable wired and/or wireless communication across network 176 (e.g., such as the Internet or local corporate intranet) with various multiple information handling systems configured as network devices $178_1$-$178_n$. It will be understood that the particular configuration of FIG. 1 is exemplary only, and that an information handling system may be configured with fewer, additional or alternative components than those illustrated in FIG. 1. It will also be understood that in some embodiments CPU 105, graphics display controller 120, PCH 160, BMC 180, TPM 190, etc. may be implemented as separate chips/devices, wherein for other embodiments they may be integrated onto a common device/chip.

Figure 2:
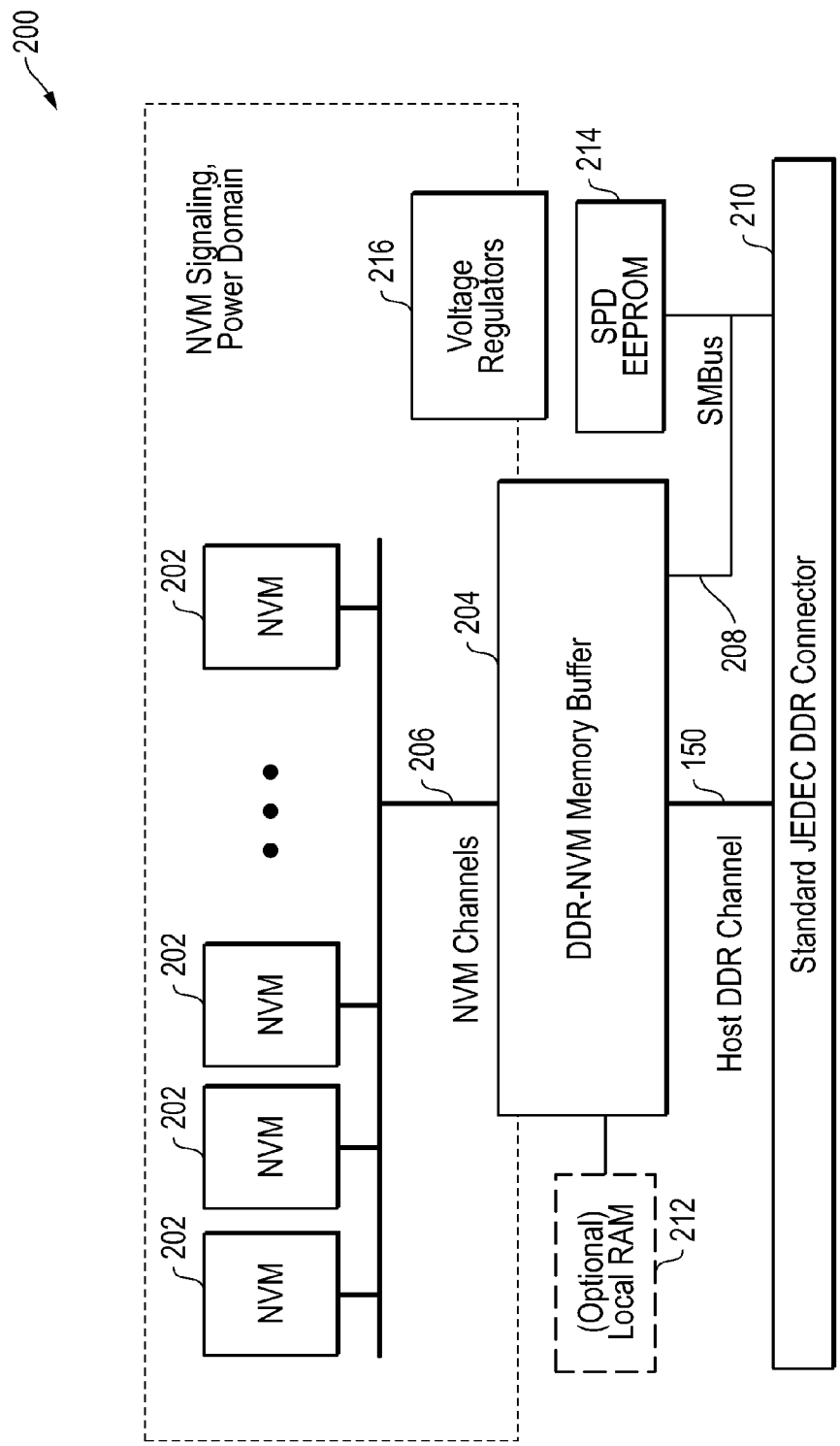
FIG. 2 illustrates a DDR-based non-volatile memory (NVM) system according to one exemplary embodiment of the disclosed systems and methods.

FIG. 2 illustrates one exemplary embodiment of a DDR-based non-volatile memory (NVM) system 200 that may be employed as at least a part of main system memory 115, e.g., in this case as a non-volatile memory (NVM)-based DIMM module. In this regard, it will be understood that in one embodiment main system memory 115 may include multiple such DDR-based non-volatile memory systems 200 coupled (e.g., as DIMM modules) to a host DDR channel 150. Such a DIMM module may be configured to maintain the same form factor as a standard JEDEC DIMM, e.g., 30.5×133.5×7.55 mm (DDR3) or 31.25×133.5×7.55 mm (DDR4), and may be configured with a standard JEDEC DDR connector as shown. However, it will be understood that in other embodiments a DDR-based non-volatile memory system 200 may be implemented in any other suitable form suitable for coupling one or more non-volatile memory devices via a host DDR channel 150 to other components (e.g., such as CPU 105) of an information handling system 100.

In the illustrated embodiment, memory system 200 of FIG. 2 includes multiple non-volatile memory (NVM) devices 202, which each may be a suitable non-volatile memory type, e.g., such as PCM-based memory (e.g., Chalcogenide glass alloys, and other materials which exhibit dramatically different and distinct resistivity in crystalline (conductive), partially crystalline (partially conductive) and amorphous (non-conductive) states), etc.) or other non-volatile memory-based type of material (e.g. Magnetic RAM (MRAM), Spin Torque Technology MRAM (STT MRAM), Ferrorelectric Memory (FERAM), Resistive Memory (RRAM, ReRAM, "memristor", etc.). It will be understood that all of memory devices 202 may be of the same type, or may be a mixture of different types of non-volatile memory types. As further shown in FIG. 2, memory devices 202 are coupled via non-volatile memory channels 206 via a memory buffer 204 to host DDR channel 150, for example, via a DDR connector 210 as shown, although any other suitable type of connection technology may be employed.

In one exemplary embodiment, PCM-based non-volatile memory devices 202 may be implemented to achieve PCM memory array read access times of less than or equal to about 60 nanoseconds, and to achieve PCM memory array write access ("SET" or "RESET" in PCM) times of from about 150 nanoseconds to about 200 nanoseconds, and alternatively less than or equal to about 150 nanoseconds. However, it will be understood that faster access times are possible, and that in one embodiment PCM memory array read access times may be substantially the same as conventional DRAM access times, e.g., from about 12 to about 15 nanoseconds. ~12-15 ns. It will be understood that for some PCM materials, write access times are slower than read access times due to the physics involved in changing a memory cell from Crystal to Amorphous (cell-local heating and cool-down).

In the embodiment of FIG. 2, memory buffer 204 is coupled between non-volatile memory devices 202 and host DDR channel 150. In this configuration, memory buffer 204 is positioned and configured to perform DDR channel-to-NVM buffering and isolation, as well as to translate DDR protocol communications if necessary (e.g., such as DDR standard signaling types DDR3, DDR4, etc.) from host DDR channel 150 to native non-volatile interface protocol communications suitable for communicating to non-volatile memory devices 202 via non-volatile memory channels 206, and vice-versa. Examples of such native non-volatile memory protocol include, but are not limited to, SPI (Serial Peripheral Interface), (Micron) P8P Parallel, ONFI (Open NAND Flash Interface), Toggle Mode Interface, Native (Proprietary) Interface, etc. In other embodiments, where non-volatile memories 202 provide a DDR compatible interface (e.g., DDR4, LPDDR3, GDDR5, etc.), DDR protocol translation may be unnecessary. Memory buffer 204 may also be optionally configured (e.g., with voltage regulation circuitry 216) to provide any necessary voltage translation/regulation between DDR rails provided by the system motherboard or riser and the NVM devices 202. Optional local RAM 212 may also be present for purposes of read and/or write buffering, read and/or write caching, command and data queuing, temporary working memory, diagnostics, error logging, BIST/self-test, and many other advantageous purposes to improve performance, power, reliability, availability, serviceability, etc.

As shown, memory system 200 may also be configured in one embodiment with a serial presence detect "SPD" EEPROM 214 coupled via SMBus 208 to memory buffer 204. SPD EEPROM 214 may store parameters for memory system 200 (e.g., descriptive and operating information such as timing, memory type or manufacturer, memory features, etc.) that may be accessed by CPU 105 to determine what type of memory system 200 (e.g., what type DIMM) is present on host DDR channel 150 and how to operate and access the memory system 200. In one embodiment where memory system 200 is configured as a DIMM module, information stored in SPD EEPROM may include, for example, parameters indicating that memory system 200 is a new non-volatile DIMM type together with associated fields that adequately describe the features and timing of the DIMM. In one embodiment, these parameters may be accessed by CPU 105 via a DDR SMBus interface 208 in a manner similar to accessing SPD EEPROM information on a standard DRAM-based DIMM. In another embodiment, these parameters may be accessed by memory buffer 204 via DDR SMBus 208, which may optionally provide indirect access to the CPU 105 via the DDR channel 150.

Figure 3:
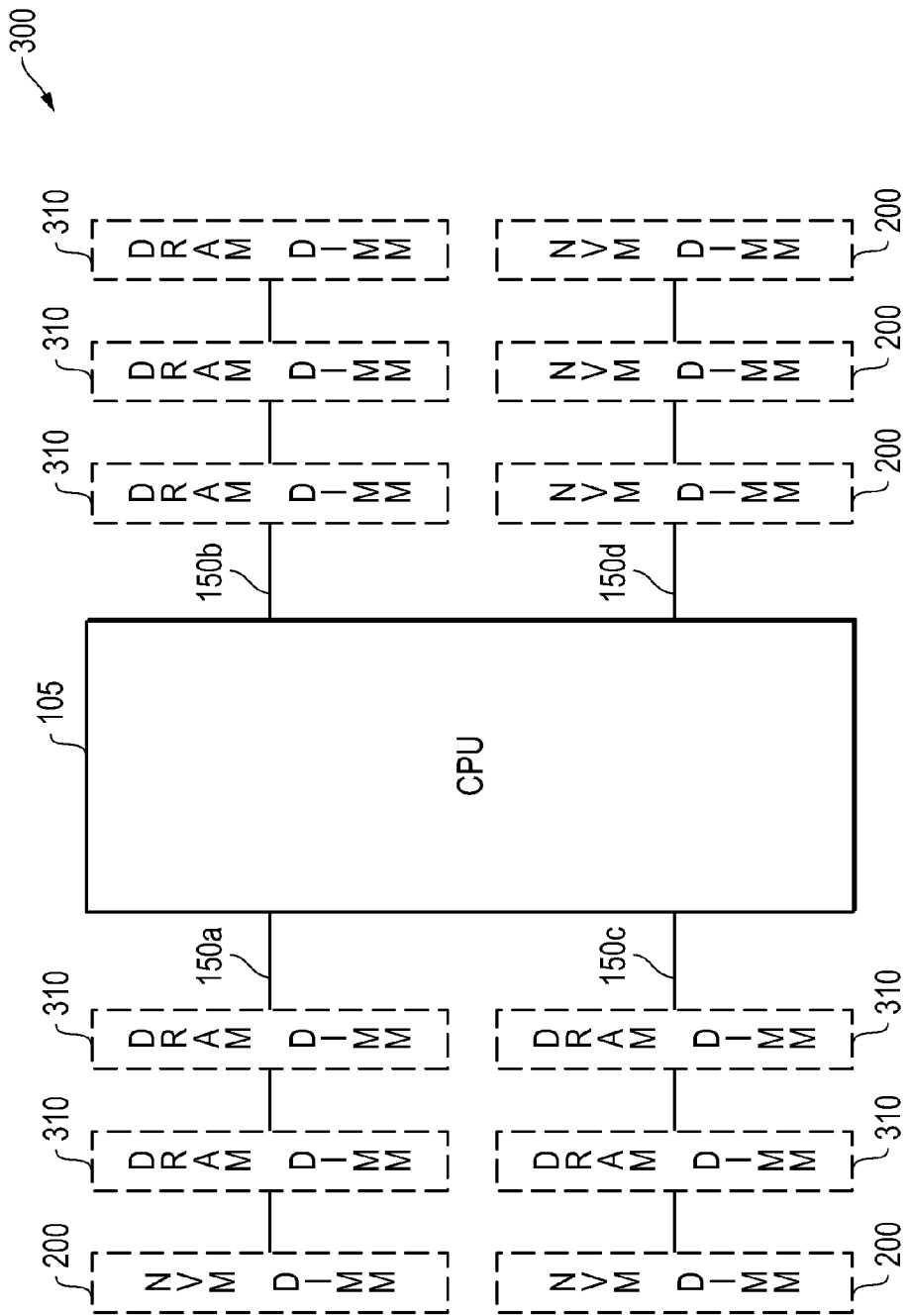
FIG. 3 illustrates one exemplary embodiment of an information handling system architecture according to one exemplary embodiment of the disclosed systems and methods.

FIG. 3 illustrates one exemplary embodiment of an information handling system architecture 300 as it may be configured with four DDR channels 150a to 150d, and with three DDR slots per each channel 150. As shown, the architecture may include a combination of standard volatile RAM-based (DRAM-based) DIMMs 310 and NVM-based DIMMs 200, although it is also possible that a combination of volatile static RAM-based DIMMs and NVM-based DIMMs may also be employed (and in possible further combination with DRAM-based DIMMs). As shown, DIMM types (i.e., DRAM-based or NVM-based) may be segregated by channel (e.g., DDR channel 150b only connects to DRAM-based DIMMs 310 and DDR channel 150d only connects to NVM-based DIMMs 200), or may be mixed on the same channel (e.g., DDR channels 150a and 150c connect to both DRAM-based DIMMs 310 and NVM-based DIMMs 200). When NVM-based DIMMs 200 and DRAM-based DIMMs 310 are mixed on a channel, a system host memory controller (e.g., iMC or non-integrated memory controller) may be programmed to handle the latency differences and turnaround times appropriately. Alternatively, it will be understood that DRAM-based DIMMs 310 may be segregated on different DDR channel/s from NVM-based DIMMs 200 (even if latencies of the NVM memory devices 202 within the NVM-based DIMMs 200 are close to latencies of the DRAM devices within a DRAM-based DIMMs 310).

As described further herein, in different exemplary embodiments, a DDR-based non-volatile memory system 200 may be accessed in one or both of at least two write modes: 1) Mode 1 (Direct Writes) in which the access time for reads and writes are fully supported within the host memory controller and all read and write memory semantics are supported at the user program level; and 2) Mode 2 (Indirect Writes) in which the access time for reads are fully supported within the host system memory controller, and all read memory semantics are supported at the user program level. However, writes are handled in Mode 2 using software-assisted write operations in which any write is explicitly commanded by software as opposed to implicitly through compiled software. These Mode 2 indirect writes may be handled in one exemplary embodiment as commands (e.g., similar to programmed input/output "PIO" commands with an IO device) using "command semantics" layered on top of the DDR protocol.

In the case of a Mode 1 direct write embodiment, host system memory controller may be configured to natively and directly support the relatively higher number of write cycles and write latency associated with non-volatile memory devices 202 of system 200. For example, memory controller extensions may be employed by host system memory controller to support higher latency of the non-volatile memory devices 202, for example, to increase the allowable round trip latency from typical DRAM range of ~20-50 ns to NVM required ~75+ ns for reads, and to optionally support 200-300+ ns for writes and read-modify writes. Other features that may be implemented by host system memory controller to support Mode 1 direct writes include, for example, increasing the read-read, read-write, write-write, etc. cycle spacing counters above the typical 10-23 cycles for conventional DIMM memory. For example, assuming ~2000 MT/s ("MegaTransfers per Second") expected in 2014, each DDR clock is ~1 ns. Thus, ~75 clocks are needed for reads, and optionally ~200-300 clocks used for writes. Yet other features that may be implemented by host system memory controller to support Mode 1 direct writes include, for example, either increasing the read first-in first-out buffers (FIFOs) to support additional reads in flight, or throttle the issued reads to limit the number of outstanding reads within the FIFO limits. Read/write conflict logic may be similarly adjusted. Additionally, any other latency dependent functions may be adjusted, such as read data strobe (DQS) leading/trailing edge training, read/write on-die termination (ODT) leading/trailing edge positioning, system timeouts, etc.

In the case of Mode 2 indirect writes, host system memory controller may be configured such that it does not directly and natively support the relatively higher number of write cycles and write latency associated with non-volatile memory devices 202. Instead, an indirect-write method may be used. In one such embodiment, write operations maybe explicitly handled by software which constructs a write command to the non-volatile memory system 200 (e.g., DIMM) through an alternate command mechanism described below ("Command Semantics"). Example code is shown below with both direct reads and an indirect write for a non-volatile (e.g., PCM)-based memory system:

```
int* p= [some location]
for ( sum=0, i=0; i<N; i++ )
sum += p[i] //Direct, implicit read
PCM_Write( dst=p+0x1000, src=&sum, sizeof(sum) )   //Indirect, explicit write
```

In such an embodiment, between indirect-writes and subsequent read, software may issue an invalidate operation for the any cache-line mapped to memory locations written.

Figure 4A:
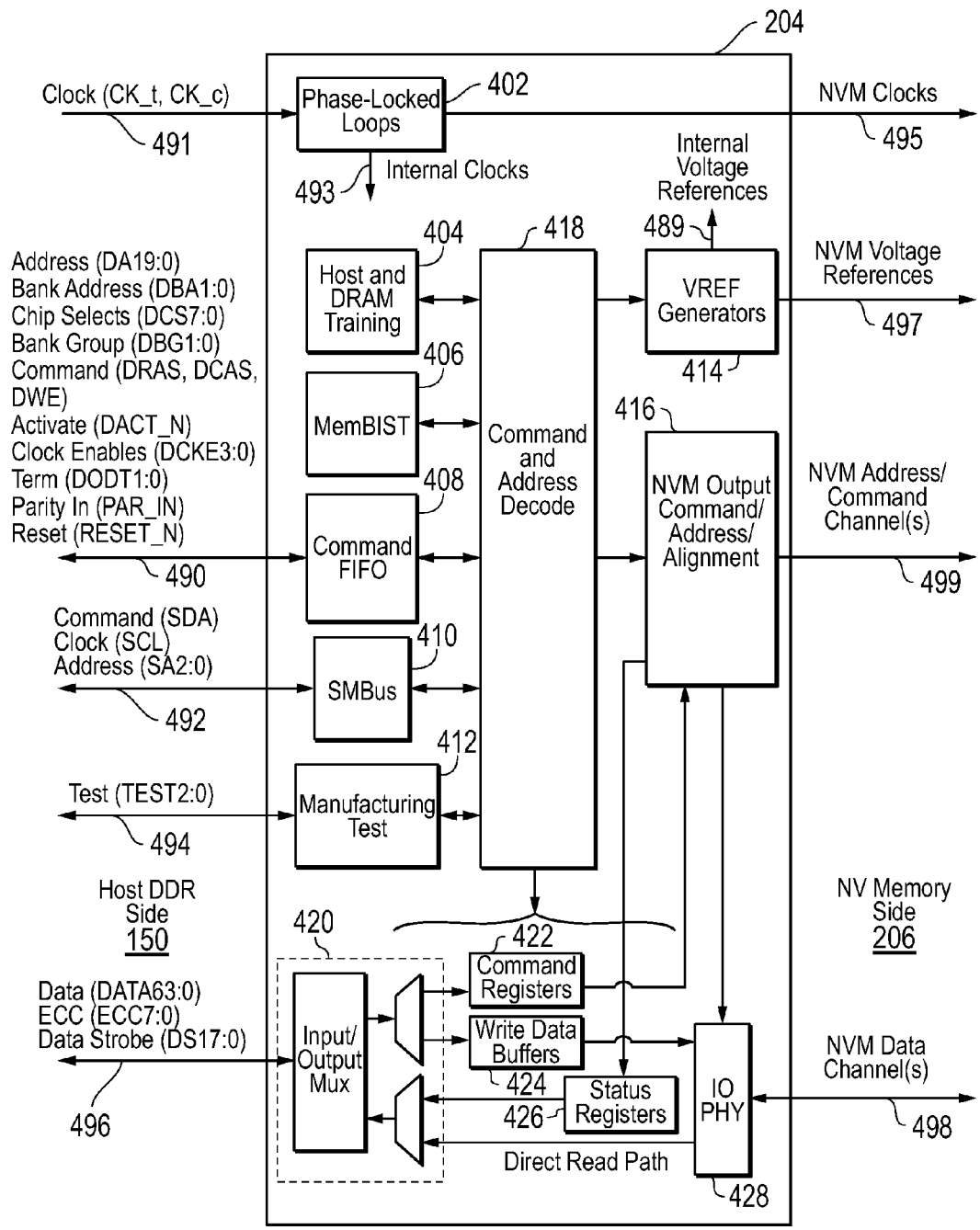
FIGS. 4A-4D illustrate a simplified block diagram of memory buffer circuitry according to one exemplary embodiment of the disclosed systems and methods.

FIG. 4A illustrates a simplified block diagram of one exemplary embodiment of memory buffer circuitry 204. Memory buffer circuitry 204 may be implemented, for example, using one or more processing devices such as application specific integrated circuit/s (ASIC), power and clock regulation circuitry, etc. In the embodiment of FIG. 4a, memory buffer circuitry 204 may include one or more phase-locked loop circuits (PLLs) 402 that provide appropriate NVM clock signals 495 for NVM devices 202 and internal clocks 493 for other components of memory buffer 204 based on an input external clock signal 491 as shown. Other components of memory buffer 204 include command and address decode circuitry 418 that, among other things, routes commands between other components of memory buffer 204. In this regard, a command first-in first-out buffer 408 is provided to receive standard operating DDR commands/signals (e.g., such as READ, WRITE, PRECHARGE, ACTIVATE, REFRESH, ZQ CALIBRATE, etc.) and special DDR commands/signals (e.g., such as POWER DOWN, RESET, etc.) from DDR command signal input 490 of host DDR channel 150. Command first-in first-out buffer 408 is configured and coupled to in turn provide DDR command signals to command and address decode circuitry 418 for further command routing as shown.

Still referring to FIG. 4A, input/output multiplexer circuitry 420 is coupled to exchange DDR data information 496, including data, error correction code (ECC) and data strobe signals with host DDR channel 150. Input/output multiplexer circuitry 420 is in turn configured to route such received data signals to one of command register circuitry 422 or write data buffers 424 in a manner as will be further described. Input/output multiplexer circuitry 420 is also configured to receive direct data reads from input output (IO) physical layer transceiver circuitry 428 and/or status register information from NVM output command/address/alignment circuitry 416 and to provide this data and/or information as DDR data information 496 in a manner as will be further described. It will be understood that the embodiment of FIG. 4A is exemplary only, and that in some embodiments command/address and data may be combined on a DDR memory channel.

Other circuitry in FIG. 4A that is shown coupled between host DDR channel 150 and command and address decode circuitry 418 includes SMBus circuitry 410 that may be present to handle SMBus communications 492 (e.g., serial data line (SDA), serial clock (SCL), and address signals), and manufacturing test circuitry 412 configured to handle test signals 494 (e.g., such as TEN Test Enable Mode, JTAG (Joint Test Action Group) interface, etc.). Also shown coupled to command and address decode circuitry 418 are host and DRAM training circuitry 404 configured to support host based timing and voltage threshold crossing point optimization of the host DDR channel 150 interface, and MemBIST circuitry 406 configured to support built-in test of the internal logic of the memory buffer 204, as well as the NV devices situated on the NV memory side 206, and optionally the Local RAM interface and devices 212.

As further shown in FIG. 4A, IO physical layer circuitry 428 is coupled between input/output multiplexer circuitry 420 and NVM data channels 498 of NVM channels 206. NVM output command/address/alignment circuitry 416 is coupled between NVM address/command channels 499 of NVM channels 206 and each of command and address decode circuitry 418, command register circuitry 422, and status registers 426. Additionally, reference voltage (VREF) generator circuitry 414 may be coupled as shown between command and address decode circuitry 418 to provide internal voltage references 489 and NVM voltage references 497 for NVM channels 206. It will be understood that the embodiment of FIG. 4A is exemplary only, and that in some embodiments command/address and data may be combined on a NVM memory channel.

In one embodiment for implementing a DDR-based NVM system 200, a command protocol may be layered on top of the DDR protocol to provide for indirect writes to NVM devices 202 and optionally other commands such as checking status, health, or log entries, and initiating configuration and self-check operations. In this regard, the address space of the NVM system 200 (e.g., configured as a DIMM) may be divided into two sections, a random-access-memory section for direct reads and/or writes and a command/response-section for indirect writes. The random-access-memory section may be mapped to the memory contents provided by the NVM memory device/s 202 and is thus sized 1:1 (e.g. 1:1 is required for direct reads and/or writes).

In an embodiment, the NVM memory device/s 202 may be so configured to respond to read and direct-writes transactions as would any other memory device. The command-section may be configured to act as memory-mapped IO registers. In such an embodiment, writing to a command register initiates an action, and reading from a status register may provide results of a command, indicate a busy state, etc. Further, a portion of this IO address space may be set aside for staging write data.

In one embodiment, concurrent commands from different CPUs 105 or threads may be managed by replicating the control registers and assigning different portions of the control address space to different CPUs 105 or threads. The one or more CPUs 105 may be configured to treat the command-section as a non-cached, write-through memory space. This configuration may be achieved using inherent capabilities of current generation CPUs, and/or by separately managing this capability, e.g., for older generation CPUs that are not inherently capable of this configuration. Interleaving of the address space between individual NVM device channels 206 is allowed. For example, when initiating writes or commands, software or firmware may use only the section of the cache-lines that map to the targeted NVM device 202. A value indicating a no-op may be used for entries that map to command registers in non-targeted NVM devices 202.

Figure 4B:
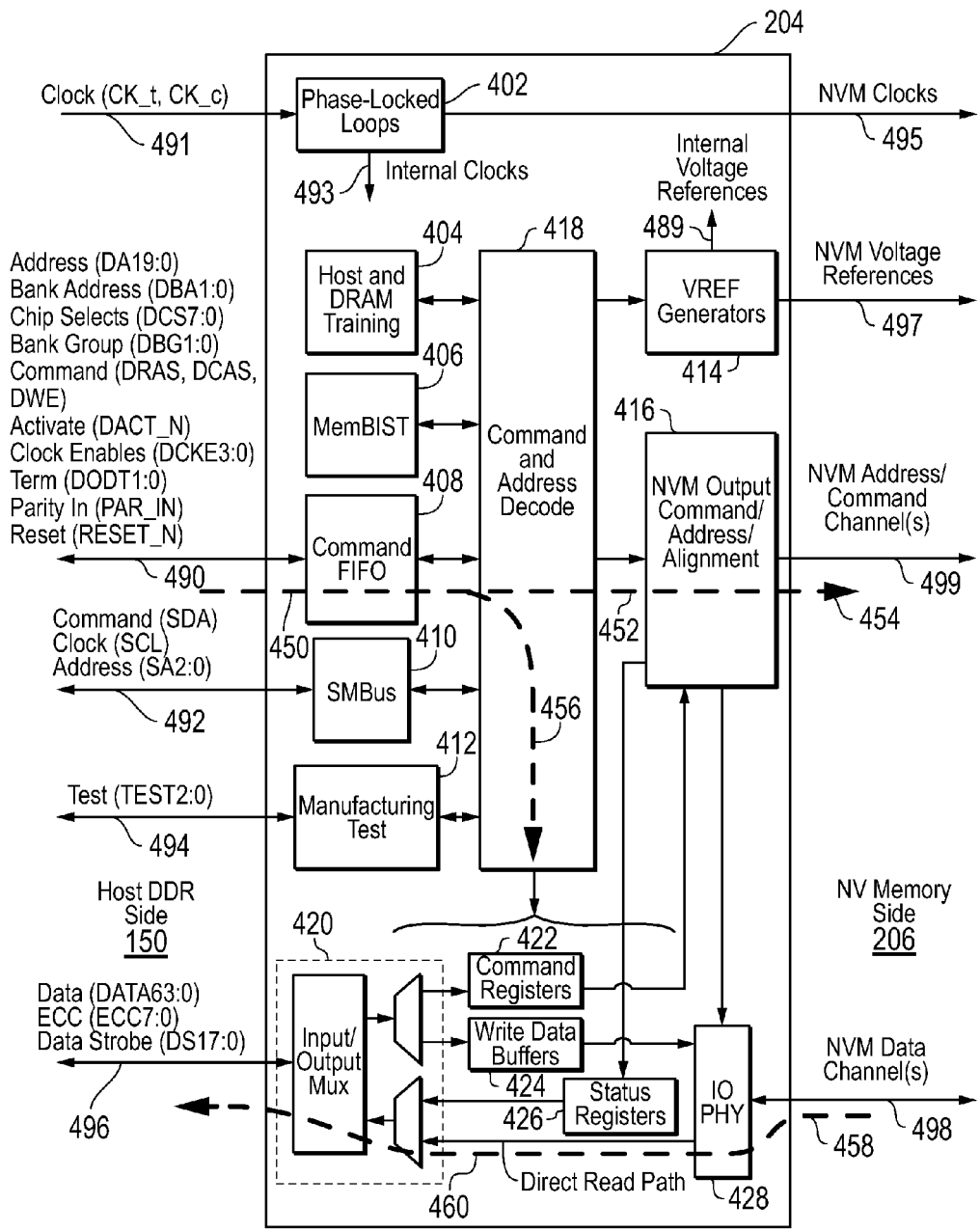

FIG. 4B illustrates a direct read operation for NVM devices 202 of NVM-based memory system 200 as it may be performed using memory buffer circuitry 204 according to one exemplary embodiment of the disclosed systems and methods. As shown, a read command 450 (e.g., from CPU 105) that includes a random access address (specified in a "random access" memory section) first arrives at command FIFO 408 of memory buffer 204. In one embodiment, such a random direct read operation may be performed using commands from a standard DDR instruction set (e.g., JEDEC JESD79-4 DDR4 Read RD (BL8 Burst Length 8 or BC4 Burst Length 4 Chop), Read on the Fly RDS4/RDS8, Read with Auto-precharge on the Fly RDAS4/RDAS8, etc.), e.g., with no operating system (OS) driver involvement and no special call to the OS or driver/s thereof.

Figure 5:
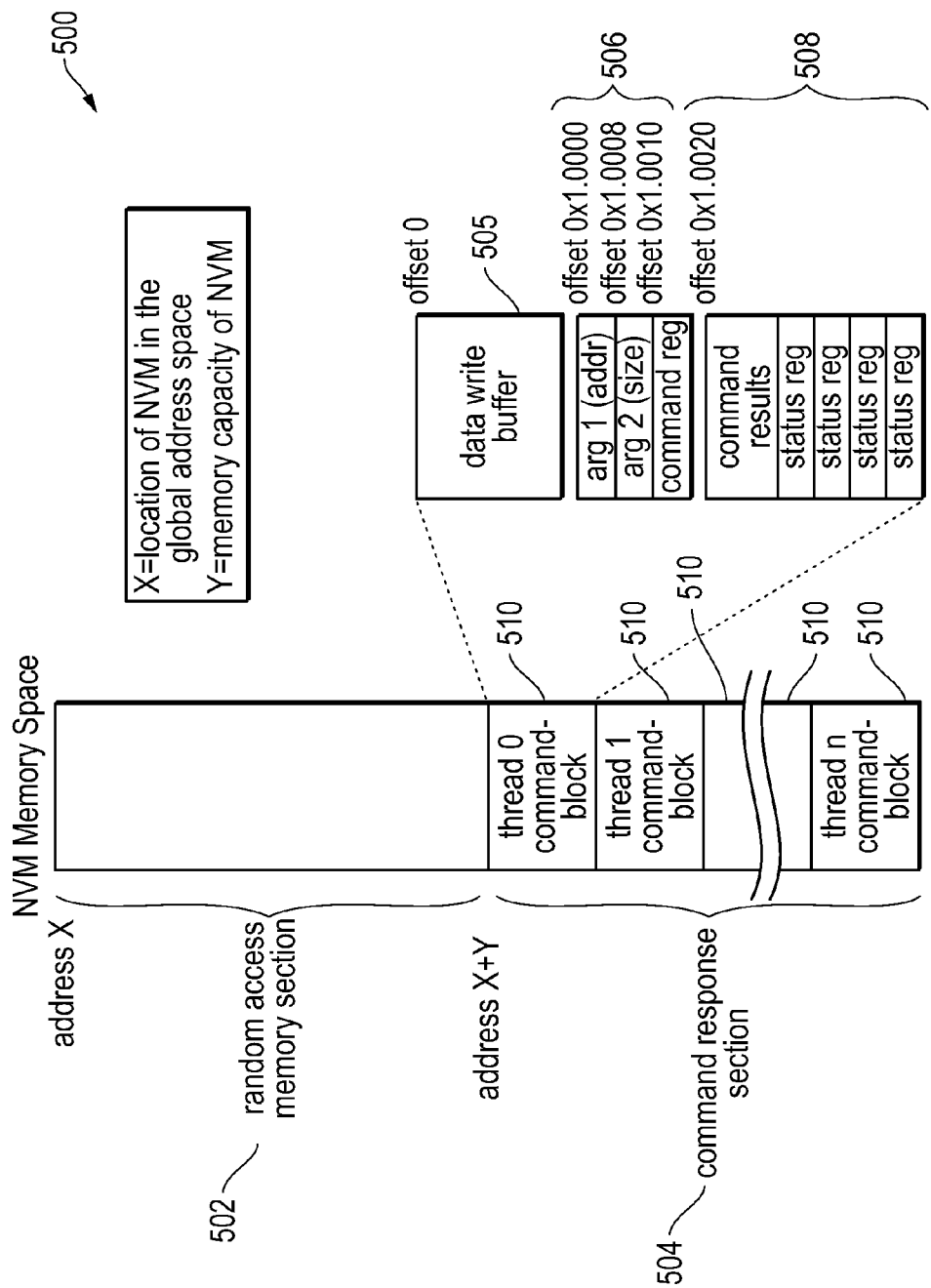
FIG. 5 shows an exemplary address space of a NVM-based memory system according to one exemplary embodiment of the disclosed systems and methods.

In this regard, FIG. 5 shows an exemplary address space 500 of a NVM-based memory system 200 (e.g., DIMM) having a random access memory section (range) 502 and a command section (range) 504 configured for implementing command semantics. Command FIFO 408 provides the received read command to command and address decode circuitry 418, which then decodes the read command and forwards the decoded command 452 (e.g., as a standard DDR command) to NVM output command/address/alignment circuitry 416, which in turn submits a read command 454 to the designated NVM memory device/s 202 across NVM address/command channels 499 as shown. The NVM memory device/s 202 designated by the read command 454 responds by returning read data 458 corresponding to the read command 454 via NVM data channels 498 to IO PHY transceiver 428 of memory buffer 204. As further shown, in response to the received read command 450, command and address decode circuitry 418 also generates and provides control signals 456 to IO mux 420 that configure IO mux 420 to transmit the read data 458 received from NVM device/s 202 via IO PHY transceiver 428 in a direct read path 460 through memory buffer 204 as DDR data information 496 on the host DDR bus 150 as shown (e.g., to CPU 105). As shown, read path 460 transfers read data directly from IO transceiver 428 to IO mux 420.

Figure 4C:
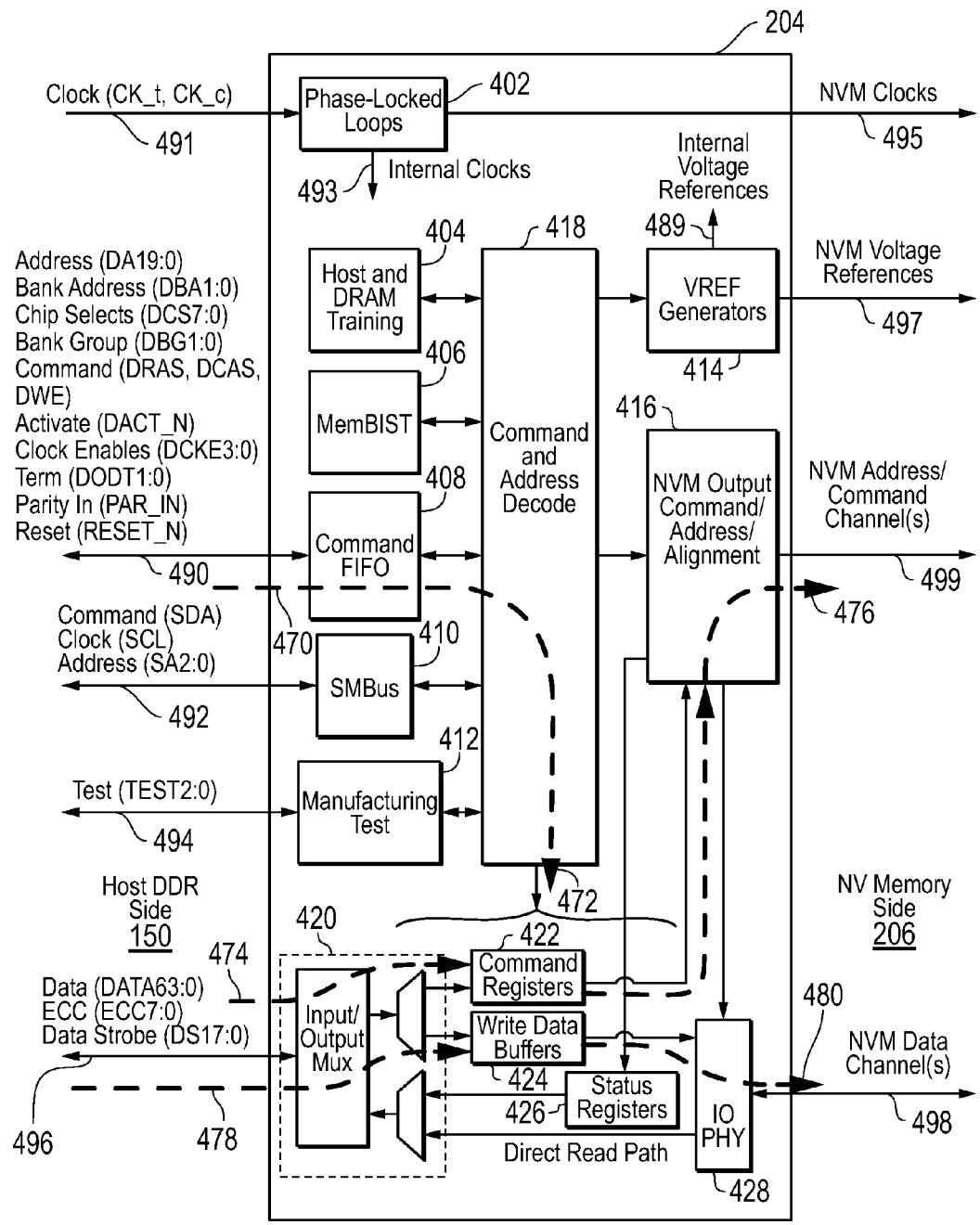
Figure 4D:
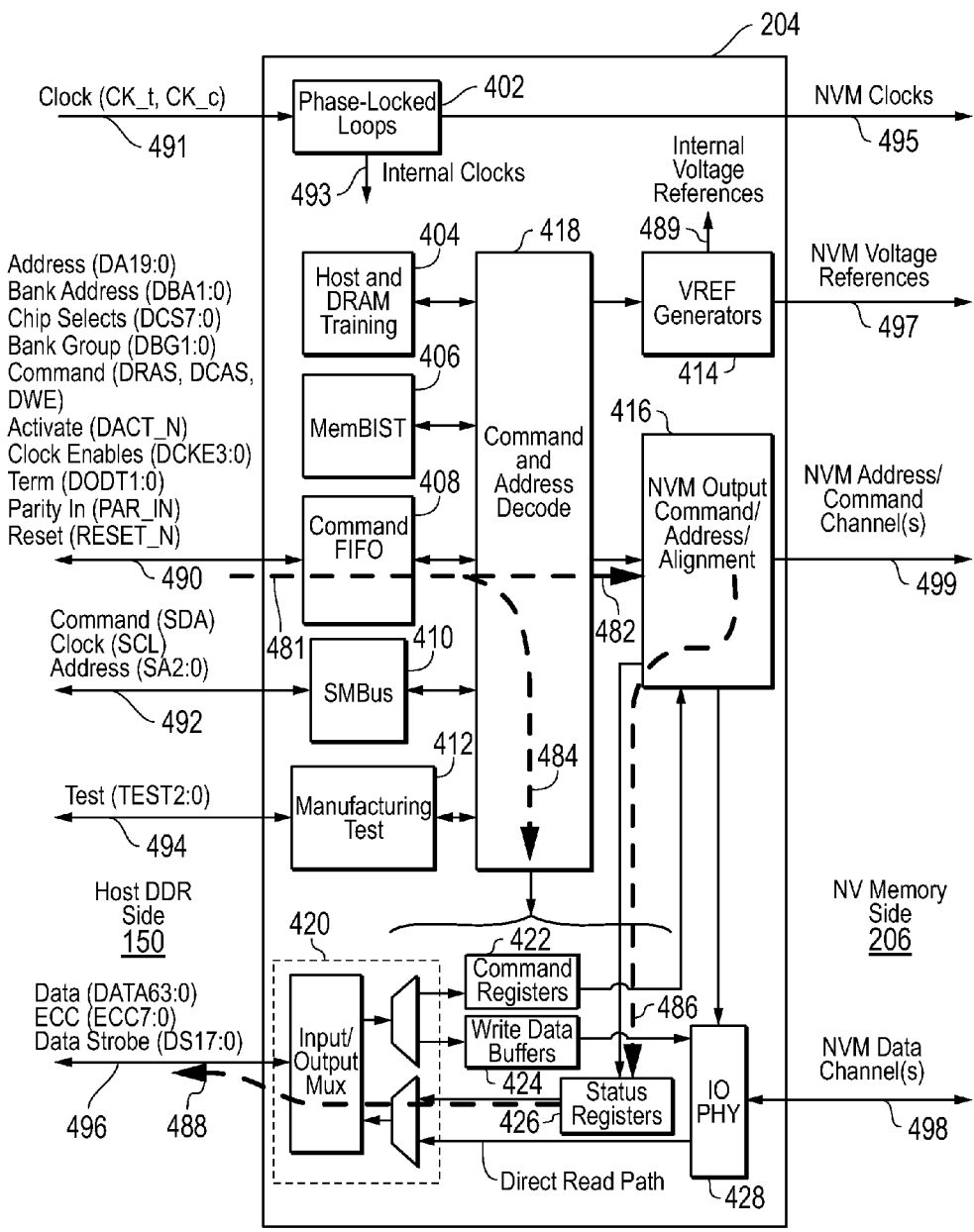

FIGS. 4C and 4D illustrate an indirect write operation for NVM devices 202 of NVM-based memory system 200 as it may be performed using memory buffer circuitry 204 according to one exemplary embodiment of the disclosed systems and methods. In the embodiment of FIGS. 4C and 4D, indirect writes to NVM devices 202 may be accomplished by calling OS Write Driver/s to manage/stage writes (with status, completion). FIG. 5 shows exemplary command/response section addresses 504 of memory space 500 of a NVM-based memory system 200 (e.g., DIMM) that represent memory mapped to IO registers supported by memory buffer circuitry 204. FIG. 5 further illustrates replicated command/response blocks 510 for IO commands from different threads or CPUs 105 that may be concurrent. Each command/response block 510 is further divided into a Write Data section 505, a Command section 506, and a Response section 508. Write Data section 505 contains the data to be written to the NVM devices 204, which may be a single byte, multiple bytes (e.g. 2 bytes, 4 bytes, 8 bytes, etc.), cache-line size (e.g. 64 bytes, 128 bytes, etc.), block size (e.g. 1K bytes, 4K bytes, etc.), or any other advantageous size. Command section 506 contains one or more arguments, including the address of the data to be written to the NV devices 204, the number of bytes to be written, specific command type, etc. Status section 508 maintains the completion status and results of the indirect write operation including for example a status flag indicating that the operation is still in process or completed, whether an error occurred, etc.

It will be understood by those skilled in the art that the OS Write Driver is responsible for creating and filling a complete command block 510 (e.g., for example all data to be written, address, command type, etc.), via multiple DDR write commands, before a final write which may indicate (trigger) that the block is ready to be handled by the memory buffer 204 (written to NVM 202). In an embodiment, the command blocks 510 may be allocated during system initialization or Power-On Self-Test (POST). In another embodiment, the command blocks 510 may be allocated dynamically during normal OS operation, when the OS Write Driver determines it needs to perform indirect writes to the NVM.

As shown in FIG. 4C, a series of DDR write commands 470 plus data 474 or 478 (e.g., from OS Write Driver executing on CPU 105) arrive at command FIFO 408 and I/O Mux 420 of memory buffer 204, respectively. Each received DDR write command 470 is decoded by command and address decode circuitry 418, which responds by providing control signals 472 to IO mux 420 that configure IO mux 420 to either write a coincidental received NVM write command 474 (e.g., received by memory buffer circuitry 204 from a CPU 105 on DDR data channel 496) to command registers 422, or to write received data 478 to write data buffers 424.

After an entire command block 510 is written to write data buffers 424 and command registers 422, the block is ready to be written by memory buffer 204 to the actual NVM 202. In this regard, a NVM write may be initiated ("triggered") in any suitable manner. For example, as already described, the NVM write may be initiated by setting a "go" flag in command block 510, using a final write address within command block 510 to designate readiness, etc.

Still referring to FIG. 4C, memory buffer 204 may then coordinate the (OS Driver staged) write to NVM 202 by initiating a sequence of NVM interface level operations. Commands are issued via path 476 from command register block 422 through NVM Output Command block 416 to the NVM address/command interface 499. Simultaneously, Data is issued from Write Data buffers 424 though 110 PHY 428 via path 480 to the NVM Data Channel(s) 498. It will be understood that a series of NVM commands 499 and data 498 may be necessary to perform the entire indirect write operation as defined by command block 510. It will also be understood that additional optional non-write type NVM commands (e.g., other than those being initiated by the OS write driver) may be issued by memory buffer 204 as necessary for NVM 202 in order to perform standard management functions, determine health, or for other reasons required. These special/management commands may be generated by optional additional control logic and register blocks (not shown) and issued via NVM Output command block 416 and IO PHY 428.

In one exemplary embodiment, depending on the write granularity capability of a given NVM 202, it may be necessary for memory buffer 204 to perform a Read-Modify write when the OS Driver Write data size is smaller than the minimum write data size allowed by NVM 202. In this case, before issuing the series of writes on NVM Address 499 and Data 498 channels, memory buffer 204 may instead issue internally generated NVM Read commands to copy the contents of the block from NVM 202 into a temporary data storage area either within buffer 204 and/or externally managed by buffer 204 (e.g., for example optional Local RAM 212). After reading the block from NVM 202, memory buffer 204 may write the entire block back to the NVM 202 by merging the new data to be written (as indicated by command block 510/data write buffer 505) with temporary read data as appropriate to complete the Read-Modify write operation.

The indirect write operation of this exemplary embodiment continues in FIG. 4D after the steps described in relation to FIG. 4C. As shown in FIG. 4D, a status check read operation 481 to the command section 504 is employed (e.g., by a writing CPU 105) to check status of the previous indirect NVM write described in relation to FIG. 4C. The status check read operation 481 arrives at command FIFO 408 of memory buffer 204, which provides the received read operation to command and address decode circuitry 418. Command and address decode circuitry 418 then decodes the read command and forwards the decoded status check command 482 (e.g., as a standard DDR command) to NVM output command/address/alignment circuitry 416, which responds by providing status information 486 of the previous indirect write (i.e., the write described in relation to FIG. 4C) to status register circuitry 426 as shown in FIG. 4D. As further shown in FIG. 4D, in response to the received read command 450, command and address decode circuitry 418 also responds to receipt of the status check read operation 481 by providing control signals 484 to IO mux 420 that configure IO mux 420 to return status register data 488 as DDR data information 496 on the host DDR bus 150 as shown (e.g., back to the writing CPU 105). In another embodiment, write status may be provide to CPU 105 by means other than polling, such as via interrupt, or out-of-band (e.g. not over DDR channel 150) messaging.

Figure 6:
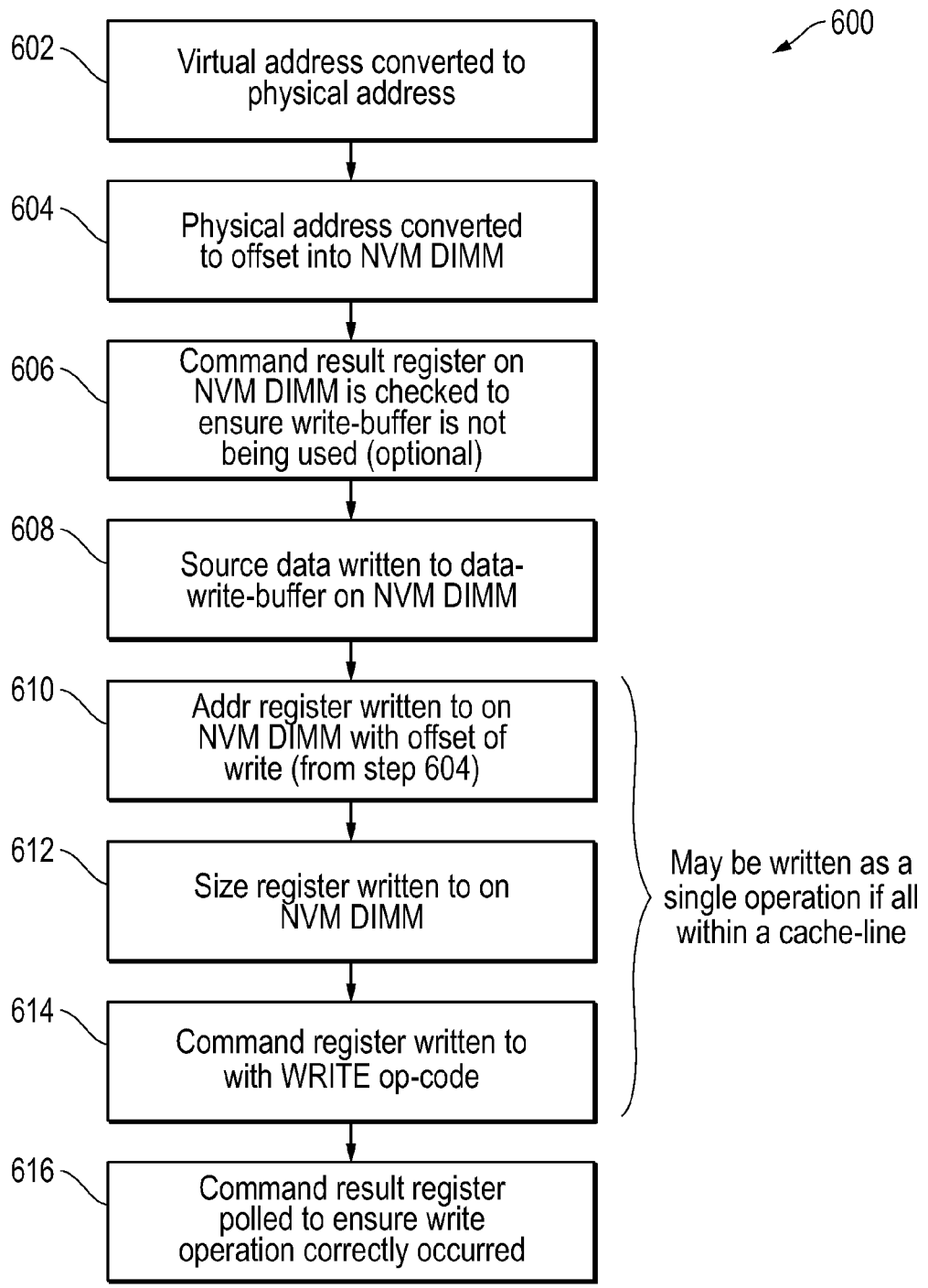
FIG. 6 illustrates one exemplary embodiment of a methodology for transacting an indirect write using command semantics according to one exemplary embodiment of the disclosed systems and methods.

FIG. 6 illustrates one exemplary embodiment of a methodology 600 for transacting an indirect write using command semantics as may be implemented by CPU 105, host system memory controller, and memory buffer 204. As shown, in step 602 virtual address is converted to physical address using standard OS memory management services and virtual memory mapping hardware in CPU 105, and then in step 604 the physical address is converted to offset into NVM-based DIMM 200 (e.g., by either by the OS or the OS NVM Write driver). Next, the command result register (e.g., 508 offset 0x1.0020 per FIG. 5) within status registers 426 on the NVM DIMM 200 may be optionally checked in step 606 to ensure that the write buffer 505 is not being used before proceeding to step 608. In step 608, source data is written to data write-buffer 505 (within write data buffers 424) on the NVM DIMM 200. Then, in step 610 the address register (e.g., 506 offset 0x1.000 per FIG. 5, within command registers 422) is written to on the NVM DIMM 200 with the offset of write from step 604. The size register (e.g., 506 offset 0x1.0008 per FIG. 5, within command registers 422) is written to on the NVM DIMM 200 in step 612. The command register (e.g., 506 offset 0x1.0010 per FIG. 5, within command registers 422) is written to with WRITE op code in step 614. It will be understood that steps 610 to 614 may be written as a single operation, or in multiple operations. Then, in step 616, the command result register (e.g., 508 offset 0x1.0020 per FIG. 5, within status registers 426) is polled by the OS NVM Write driver to ensure that the write operation correctly occurred.

FIG. 7 illustrates DDR channel 150 level transactions for direct reads and indirect writes, and specifically illustrates a DDR channel trace for a set of transactions that copies memory from offset 0x2000 to offset of 0x9000 of a NVM-based DIMM 200. The address map used is from FIG. 5, with X=location of NVM in the global address space of DIMM 200, and Y=memory capacity of the NVM for DIMM 200.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. An information handling system, comprising:
   at least one host processing device configured to execute an operating system (OS) and one or more OS write drivers configured to manage writes; and
   a double data rate (DDR)-based non-volatile memory (NVM) system comprising one or more NVM devices coupled to the host processing device through a memory buffer that includes write buffer circuitry, the memory buffer being coupled to the host processing device by a DDR memory channel and the memory buffer being coupled to the DDR-based NVM system by a NVM channel;
   where the host processing device is configured to access the DDR-based NVM system across the DDR memory channel for data read and data write operations through the memory buffer and the NVM channel;
   where the memory buffer is configured to respond to receipt of standard DDR read commands received across the DDR memory channel from the host processing device by performing direct reads of data stored on the NVM memory devices across the NVM channel, and providing the read data directly from the NVM channel directly to the DDR memory channel by a direct read path that is within the memory buffer but not through the write buffer circuitry to the host processing device across the DDR memory channel; and where the memory buffer is configured to respond to receipt of write commands received across the DDR memory channel from the OS write drivers of the host processing device by performing indirect writes of data to the NVM memory devices across the NVM channel.

2. The system of claim 1, where the memory buffer is configured to respond to receipt of standard DDR read commands received across the DDR memory channel from the host processing device by performing direct program level semantic memory reads of data stored on the NVM memory devices across the NVM channel with no OS driver calls, and providing the read data to the host processing device across the DDR memory channel; and where the memory buffer is configured to respond to receipt of a series of DDR write commands received across the DDR memory channel from the OS write drivers of the host processing device by performing indirect writes of data to the NVM memory devices across the NVM channel in response to one or more OS driver calls.

3. The system of claim 1, where the memory buffer is configured to respond to receipt of standard DDR read commands received across the DDR memory channel from the host processing device by performing direct program level semantic memory reads of data stored on the NVM memory devices across the NVM channel, and providing the read data to the host processing device across the DDR memory channel; and where the memory buffer is configured to respond to receipt of write commands received across the DDR memory channel using command semantics layered on top of DDR protocol.

4. The system of claim 1, where the memory buffer is configured to respond to receipt of a series of DDR write commands received across the DDR memory channel by deriving and issuing a corresponding series of NVM write commands to the DDR-based non-volatile memory system across the NVM channel, the series of DDR write commands being different than the corresponding series of DDR write commands that were received across the DDR memory channel.

5. The system of claim 1, where the NVM memory devices comprise Phase Change Memory (PCM)-based memory devices.

6. The system of claim 1, where the DDR memory channel comprises a DDR command channel and a DDR data channel; where the NVM channel comprises a NVM command channel and a NVM data channel; where the memory buffer comprises at least one processing device coupled to input/output multiplexer circuitry, the input/output multiplexer circuitry being coupled between the DDR data channel and the NVM data channel; and where the processing device is configured to control circuitry of the memory buffer to:

receive a read command from the host processing device across the DDR command channel, the read command including a random access memory address designating one or more of the NVM devices;

in response to the received read command, submitting a read command to the random access address of the designated NVM devices across the NVM command channel; and receive read data at the input/output multiplexer circuitry from the NVM devices from across the NVM data channel corresponding to the read command submitted across the NVM command channel;

where the processing device is further configured to provide control signals to configure the input/output multiplexer to transmit the read data received from the NVM devices by a direct read path through the memory buffer from the NVM data channel via the DDR data channel to the host processing device.

7. The system of claim 6, where the command register circuitry and write buffer circuitry are each coupled to the input/output multiplexer circuitry; and where the processing device is further configured to control circuitry of the memory buffer to:

receive a series of DDR write commands from the OS write drivers of the host processing device across the DDR command channel, the DDR write commands targeting command sections of a designated one or more of the NVM memory devices;

receive at the input/output multiplexer circuitry a series of NVM write commands from the OS write drivers of the host processing device across the DDR data channel coincident with the DDR write commands received across the DDR command channel; and receive write data at the input/output multiplexer circuitry across the DDR data channel to be written to the designated NVM memory devices;

where in response to the DDR write commands received across the DDR command channel the processing device is further configured to provide control signals to configure the input/output multiplexer to provide the received write data to the write buffer circuitry and to provide the received NVM write commands to the command register circuitry;

where the write buffer circuitry is configured to provide the received write data to the designated NVM memory devices across the NVM data channel; and where coincident with the write data provided to the designated NVM memory devices, the command register circuitry is configured to forward write requests corresponding to the received NVM write commands to the designated NVM memory devices across the NVM command channel to cause the write data to be written to the designated NVM memory devices.

8. The system of claim 1, where the DDR memory channel comprises a DDR command channel and a DDR data channel; where the NVM channel comprises a NVM command channel and a NVM data channel; where the memory buffer comprises at least one processing device; where the at least one processing device, command register circuitry, and write buffer circuitry are each coupled to input/output multiplexer circuitry, the input/output multiplexer circuitry being coupled between the DDR data channel and the NVM data channel; and where the processing device is configured to control circuitry of the memory buffer to:

receive a series of DDR write commands from the OS write drivers of the host processing device across the DDR command channel, the DDR write commands targeting a command section of a designated one or more of the NVM memory devices;

receive at the input/output multiplexer circuitry a series of NVM write commands from the OS write drivers of the host processing device across the DDR data channel coincident with the DDR write commands received across the DDR command channel; and receive write data at the input/output multiplexer circuitry across the DDR data channel to be written to the designated NVM memory devices;

where in response to the DDR write commands received across the DDR command channel the processing device is further configured to provide control signals to configure the input/output multiplexer to provide the received write date to the write buffer circuitry and to provide the received NVM write commands to the command register circuitry;

where the write buffer circuitry is configured to forward the received write data to the designated NVM memory devices across the NVM data channel; and where coincident with the write data forwarded to the designate NVM memory devices, the command register circuitry is configured to forward write requests corresponding to the received NVM write commands to the designated NVM memory devices across the NVM command channel to cause the write data to be written to the designated NVM memory devices.

9. The system of claim 8, where the memory buffer further comprises status register circuitry coupled to input/output multiplexer circuitry; and where the processing device is configured to control circuitry of the memory buffer to:

receive a status check read operation across the DDR command channel from the host processing device after the write data is written to the designated NVM memory devices;

in response to the received read command, provide control signals to configure the input/output multiplexer to provide status information regarding the previous write of data to the designated NVM memory devices from the status register circuitry to the host processing device across the DDR data channel.

10. The system of claim 1, further comprising:

at least one DDR-based volatile random access memory (RAM) system comprising one or more RAM devices coupled to the host processing device through the memory buffer, the memory buffer being coupled to the host processing device by a first DDR memory channel and the memory buffer being coupled to the DDR-based volatile RAM system by a second DDR channel;

where the host processing device is configured to access the DDR-based volatile system across the first and second DDR memory channels for data read and data write operations through the memory buffer;

where the memory buffer is configured to respond to receipt of standard DDR read commands received across the first DDR memory channel from the host processing device by performing direct reads of data stored on the volatile RAM memory devices across the second DDR channel, and providing the read data to the host processing device across the first DDR memory channel;

where the memory buffer is configured to respond to receipt of write commands received across the first DDR memory channel by performing direct writes of data to the volatile RAM memory devices across the second DDR channel.

11. A method for reading and writing data to a double data rate (DDR)-based non-volatile memory (NVM) system, the method comprising:

providing at least one host processing device configured to execute an operating system (OS) and one or more OS write drivers configured to manage writes;

providing a double data rate (DDR)-based non-volatile memory (NVM) system comprising one or more NVM devices coupled to the host processing device through a memory buffer that includes write buffer circuitry, the memory buffer being coupled to the host processing device by a DDR memory channel and the memory buffer being coupled to the DDR-based NVM system by a NVM channel;

accessing the DDR-based NVM system across the DDR memory channel using the host processing device for data read and data write operations through the memory buffer and the NVM channel;

responding to receipt of standard DDR read commands received across the DDR memory channel in the memory buffer from the host processing device by performing direct reads of data stored on the NVM memory devices across the NVM channel, and providing the read data directly from the NVM channel directly to the DDR memory channel by a direct read path that is within the memory buffer but not through the write buffer circuitry to the host processing device across the DDR memory channel; and responding to receipt of write commands received across the DDR memory channel in the memory buffer from the OS write drivers of the host processing device by performing indirect writes of data to the NVM memory devices across the NVM channel.

12. The method of claim 11, further comprising responding to receipt of standard DDR read commands received in the memory buffer across the DDR memory channel from the host processing device by performing direct program level semantic memory reads of data stored on the NVM memory devices across the NVM channel with no OS driver calls, and providing the read data to the host processing device across the DDR memory channel; and responding to receipt of a series of DDR write commands received across the DDR memory channel in the memory buffer from the OS write drivers of the host processing device by performing indirect writes of data to the NVM memory devices across the NVM channel in response to one or more OS driver calls.

13. The method of claim 11, further comprising responding to receipt of standard DDR read commands received across the DDR memory channel in the memory buffer from the host processing device by performing direct program level semantic memory reads of data stored on the NVM memory devices across the NVM channel, and providing the read data to the host processing device across the DDR memory channel; and responding to receipt of write commands received across the DDR memory channel in the memory buffer using command semantics layered on top of DDR protocol.

14. The method of claim 11, further comprising responding to receipt of a series of DDR write commands received across the DDR memory channel in the memory buffer by deriving and issuing a corresponding series of NVM write commands to the DDR-based non-volatile memory system across the NVM channel using a series of DDR write commands that are different that the corresponding series of DDR write commands that were received across the DDR memory channel.

15. The method of claim 11, where the NVM memory devices comprise Phase Change Memory (PCM)-based memory devices.

16. The method of claim 11, where the DDR memory channel comprises a DDR command channel and a DDR data channel; where the NVM channel comprises a NVM command channel and a NVM data channel; where the memory buffer comprises at least one processing device coupled to input/output multiplexer circuitry, the input/output multiplexer circuitry being coupled between the DDR data channel and the NVM data channel; and where the method further comprises using the processing device to control circuitry of the memory buffer to:

receive a read command from the host processing device across the DDR command channel, the read command including a random access memory address designating one or more of the NVM devices;

in response to the received read command, submit a read command to the random access address of the designated NVM devices across the NVM command channel; and receive read data at the input/output multiplexer circuitry from the NVM devices from across the NVM data channel corresponding to the read command submitted across the NVM command channel;

where the processing device is further configured to provide control signals to configure the input/output multiplexer to transmit the read data received from the NVM devices by a direct read path through the memory buffer from the NVM data channel via the DDR data channel to the host processing device.

17. The method of claim 16, where the command register circuitry and write buffer circuitry are each coupled to the input/output multiplexer circuitry; and where the method further comprises using the processing device to control circuitry of the memory buffer to:

receive a series of DDR write commands from the OS write drivers of the host processing device across the DDR command channel, the DDR write commands targeting a command section of a designated one or more of the NVM memory devices;

receive at the input/output multiplexer circuitry a series of NVM write commands from the OS write drivers of the host processing device across the DDR data channel coincident with the DDR write commands received across the DDR command channel; and receive write data at the input/output multiplexer circuitry across the DDR data channel to be written to the designated NVM memory devices;

where in response to the DDR write commands received across the DDR command channel the processing device is further configured to provide control signals to configure the input/output multiplexer to provide the received write date to the write buffer circuitry and to provide the received NVM write commands to the command register circuitry;

where the write buffer circuitry is configured to provide the received write data to the designated NVM memory devices across the NVM data channel; and where coincident with the write data provided to the designate NVM memory devices, the command register circuitry is configured to forward write requests corresponding to the received NVM write commands to the designated NVM memory devices across the NVM command channel to cause the write data to be written to the designated NVM memory devices.

18. The method of claim 11, where the DDR memory channel comprises a DDR command channel and a DDR data channel; where the NVM channel comprises a NVM command channel and a NVM data channel; where the memory buffer comprises at least one processing device; where the at least one processing device, command register circuitry, and write buffer circuitry are each coupled to input/output multiplexer circuitry, the input/output multiplexer circuitry being coupled between the DDR data channel and the NVM data channel; and where the method further comprises using the processing device to control circuitry of the memory buffer to:

receive a series of DDR write commands from the OS write drivers of the host processing device across the DDR command channel, the DDR write commands targeting a command section of a designated one or more of the NVM memory devices;

receive at the input/output multiplexer circuitry a series of NVM write commands from the OS write drivers of the host processing device across the DDR data channel coincident with the DDR write commands received across the DDR command channel; and receive write data at the input/output multiplexer circuitry across the DDR data channel to be written to the designated NVM memory devices;

where in response to the DDR write commands received across the DDR command channel the processing device is further configured to provide control signals to configure the input/output multiplexer to provide the received write date to the write buffer circuitry and to provide the received NVM write commands to the command register circuitry;

where the write buffer circuitry is configured to forward the received write data to the designated NVM memory devices across the NVM data channel; and where coincident with the write data forwarded to the designate NVM memory devices, the command register circuitry is configured to forward write requests corresponding to the received NVM write commands to the designated NVM memory devices across the NVM command channel to cause the write data to be written to the designated NVM memory devices.

19. The method of claim 18, where the memory buffer further comprises status register circuitry coupled to input/output multiplexer circuitry; and where the method further comprises using the processing device to control circuitry of the memory buffer to:

receive a status check read operation across the DDR command channel from the host processing device after the write data is written to the designated NVM memory devices;

in response to the received read command, provide control signals to configure the input/output multiplexer to provide status information regarding the previous write of data to the designated NVM memory devices from the status register circuitry to the host processing device across the DDR data channel.

20. The method of claim 11, further comprising:

providing at least one DDR-based volatile random access memory (RAM) system comprising one or more RAM devices coupled to the host processing device through the memory buffer, the memory buffer being coupled to the host processing device by a first DDR memory channel and the memory buffer being coupled to the DDR-based volatile RAM system by a second DDR channel;

accessing the DDR-based volatile RAM system across the first DDR memory channel using the host processing device for data read and data write operations through the memory buffer and the second DDR memory channel;

responding to receipt of standard DDR read commands received across the first DDR memory channel in the memory buffer from the host processing device by performing direct reads of data stored on the volatile RAM devices across the second DDR channel, and providing the read data to the host processing device across the first DDR memory channel;

responding to receipt of write commands received across the first DDR memory channel in the memory buffer from the host processing device by performing direct writes of data to the volatile RAM memory devices across the second DDR channel.

21. The system of claim 1, where the memory buffer comprises input/output multiplexer circuitry coupled between the DDR data channel and the NVM data channel; and input output (IO) physical layer transceiver circuitry coupled between the input/output multiplexer circuitry and the NVM data channel; and where the memory buffer is further configured to respond to receipt of standard DDR read commands received across the DDR memory channel from the host processing device by performing direct reads of data stored on the NVM memory devices across the NVM channel, and providing the read data directly from the NVM channel directly to the DDR memory channel by a direct read path between the input output (TO) physical layer transceiver circuitry and the input/output multiplexer circuitry to the host processing device across the DDR memory channel.

22. The method of claim 11, where the memory buffer comprises input/output multiplexer circuitry coupled between the DDR data channel and the NVM data channel; and input output (IO) physical layer transceiver circuitry coupled between the input/output multiplexer circuitry and the NVM data channel; and where the method further comprises responding to receipt of standard DDR read commands received across the DDR memory channel in the memory buffer from the host processing device by performing direct reads of data stored on the NVM memory devices across the NVM channel, and providing the read data directly from the NVM channel directly to the DDR memory channel by a direct read path between the input output (IO) physical layer transceiver circuitry and the input/output multiplexer circuitry to the host processing device across the DDR memory channel.

23. An information handling system, comprising:
  at least one first processing device configured as a host processing device to execute an operating system (OS); and
  a double data rate (DDR)-based non-volatile memory (NVM) system comprising one or more NVM devices coupled to the host processing device through a second processing device, the second processing device being coupled to the host processing device by a DDR memory channel and the second processing device being coupled to the DDR-based NVM system by a NVM channel;
  where the host processing device and second processing device are configured to perform a direct read operation of data stored on the NVM memory devices using a single DDR read command transaction that includes the following sequence of steps:
    the host processing device being configured to provide a single standard DDR read command across the DDR memory channel from the host processing device to the second processing device, the DDR read command including a random access memory address designating one or more of the NVM devices; and
    the second processing device being configured to then respond to receipt of the single standard DDR read command at the second processing device by submitting a read command from the second processing device to the random access address of the designated NVM devices across the NVM command channel;
    the second processing device being configured to then receive read data from the NVM devices at the second processing device from across the NVM data channel, the read data corresponding to the read command submitted across the NVM command channel; and
    the second processing device being configured to then transmit the received read data from the second processing device to the host processing device to complete the direct read operation.

24. The system of claim 23, further comprising write buffer circuitry and command registers coupled to the second processing device; where the host processing device is further configured to execute one or more OS write drivers to manage writes; and where the host processing device and second processing device are further configured to perform an indirect write operation of data to the NVM memory devices across the NVM channel in response to OS driver calls by a series of multiple DDR read command transactions that includes the following sequence of steps:
  the host processing device being configured to provide a series of multiple DDR write commands and corresponding write data from the OS write drivers of the host processing device to the second processing device, the DDR write commands including corresponding NVM write commands;
  the second processing device being configured to then respond to receipt of the series of multiple DDR write commands and corresponding write data and NVM write commands received across the DDR memory channel from the OS write drivers of the host processing device by writing received write data from each of the multiple DDR write commands to the write buffer circuitry and writing received NVM write commands from each of the multiple DDR write commands to the command registers; and
  the second processing device being configured to then perform the steps of issuing write commands from the command registers to the NVM devices across the NVM command channel and transmitting the corresponding write data to the NVM devices across the NVM data channel to complete the indirect write operation, only after writing the received write data from each of the multiple DDR write commands to the write buffer circuitry and only after writing the received NVM write commands from each of the multiple DDR commands to the command registers.

25. A method for reading data from a double data rate (DDR)-based non-volatile memory (NVM) system, the method comprising:
  providing at least one first processing device configured as a host processing device to execute an operating system (OS);
  providing a double data rate (DDR)-based non-volatile memory (NVM) system comprising one or more NVM devices coupled to the host processing device through at least one second processing device that is coupled to the host processing device by a DDR memory channel and that is coupled to the DDR-based NVM system by a NVM channel;
  performing a direct read operation of data stored on the NVM memory devices using a single DDR read command transaction that includes the following sequence of steps:
    using the host processing device to provide a single standard DDR read command across the DDR memory channel from the host processing device to the second processing device, the DDR read command including a random access memory address designating one or more of the NVM devices; and
    then using the second processing device to respond to receipt of the single standard DDR read command at the second processing device by submitting a read command from the second processing device to the random access address of the designated NVM devices across the NVM command channel;

then using the second processing device to receive read data from the NVM devices at the second processing device from across the NVM data channel, the read data corresponding to the read command submitted across the NVM command channel; and then using the second processing device to transmit the received read data from the second processing device to the host processing device to complete the direct read operation.

26. The method of claim 25, further comprising providing write buffer circuitry and command registers coupled to the second processing device;

using the host processing device to execute one or more OS write drivers to manage writes; and performing an indirect write operation of data to the NVM memory devices across the NVM channel in response to OS driver calls by a series of multiple DDR read command transactions that includes the following sequence of steps:

using the host processing device to provide a series of multiple DDR write commands and corresponding write data from the OS write drivers of the host processing device to the second processing device, the DDR write commands including corresponding NVM write commands;

then using the second processing device to respond to receipt of the series of multiple DDR write commands and corresponding write data and NVM write commands received across the DDR memory channel from the OS write drivers of the host processing device by writing received write data from each of the multiple DDR write commands to the write buffer circuitry and writing received NVM write commands from each of the multiple DDR write commands to the command registers; and then using the second processing device to perform the steps of issuing write commands from the command registers to the NVM devices across the NVM command channel and transmitting the corresponding write data to the NVM devices across the NVM data channel to complete the indirect write operation, only after writing the received write data from each of the multiple DDR write commands to the write buffer circuitry and only after writing the received NVM write commands from each of the multiple DDR commands to the command registers.

* * * * *